Figure 1:
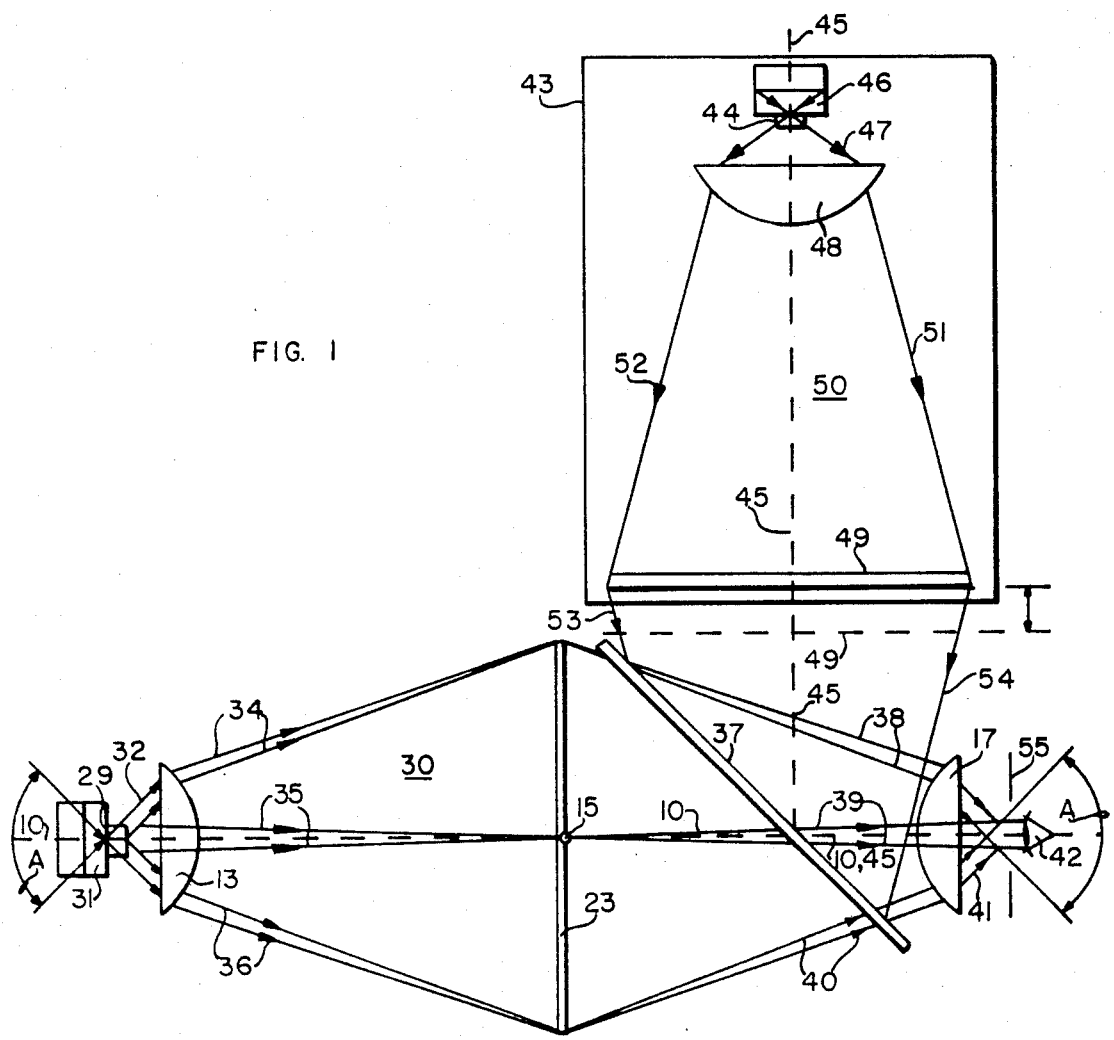

[11] 3,575,494

[72] Inventors Thomas P. ~~~~~~~~~
 Baltimore, Md.;
 Walter E. Myles, Alexandria, Va.
[21] Appl. No. 810,859
[22] Filed Sept. 17, 1968
 Division of Ser. No. 511,149, Dec. 2, 1965.
[45] Patented Apr. 20, 1971
[73] Assignee Singer-General Precision Inc.
 Binghamton, N.Y.

[54] VIRTUAL IMAGE CORRECTION LENS SYSTEM
 2 Claims, 3 Drawing Figs.
[52] U.S. Cl. .................................................. 350/189,
 350/175
[51] Int. Cl. ................................................ G02b 3/04
[50] Field of Search .......................................... 350/189,
 175 (E), 198, (Inquired)

[56] References Cited
UNITED STATES PATENTS
| | | | |
|---|---|---|---|
| 1,507,212 | 9/1924 | Silberstein.................... | 350/189 |
| 3,459,468 | 8/1969 | Marx et al..................... | 350/189X |

FOREIGN PATENTS
| | | | |
|---|---|---|---|
| 395 | 1900 | Great Britain................ | 350/189 |

*Primary Examiner*—David Schonberg
*Assistant Examiner*—Paul A. Sacher
*Attorneys*—Francis L. Masselle and William Grobman ABSTRACT: A visual system including a viewing window to present to a viewer a realistic virtual image representing a plurality of objects is disclosed. The images of the plurality of objects are often projected onto flat surfaces, and this disclosure sets forth a lens system which corrects for the spherical aberration caused by the spherical lenses and for the changes in the position of the viewer's eye by providing a window having an elliptical lens and a spherical corrector.

INVENTOR.
Thomas P. Neuberger
Walter E. Myles
BY
William Grolman

VIRTUAL IMAGE CORRECTION LENS SYSTEM

This application is a division of the copending U.S. Pat. application Ser. No. 511,149, filed on Dec. 2, 1965 in the names of Thomas P. Neuberger and Walter E. Myles and entitled Virtual Window Display.

This invention relates to displays and, more particularly, to displays of virtual images which are composites of two or more separate images.

In the training of pilots and passengers for travel through interplanetary space, the very nature of the mission itself indicates the necessity of simulated flights for training purposes. The problems of landing a craft upon a distant celestial body or of rendezvousing in space with other vehicles will be at least partially accomplished by the pilot's reaction to visual observations made through windows provided for this purpose. Suitable training in simulated vehicles infers proper simulation of the visible stimulations to the pilot as well as blind stimulations. To provide such suitable simulations of visible phenomena, the displays must be capable of simulating relative movement of a close object with respect to a more distant background. In addition, the proper responses are evoked only by displays which are realistic in appearance as well as in movement of both the simulated objects and the observer.

The simulated display must incorporate a background which appears to be at an infinite distance from the observer and which must yet change in appearance with the progress of the simulated mission; and it must also incorporate images representative of objects relatively close to the observer, which objects not only may change in appearance as the simulated mission progresses, but which may also vary in distance from the observer as time moves on. In addition, the close objects must be viewable from any of several different angles and at each must present a believable and realistic image. Thus, as a simulated mission progresses, the display must vary also, and in a wholly believable fashion.

There are several things which contribute to the believability of a display. One is the fidelity with which the relative distances of objects of varying distance from the observer is simulated. Another is the elimination of aberration which normally is present in optical systems, and especially in displays which may include the projection of images on flat surfaces or from flat surfaces. Another factor is the ability of the display to appear natural from any aspect from which it is viewed by the observer. It must appear to move realistically or to stand still as the observer moves his head.

Plausibility is important in instilling in the mind of a trainee in a simulated situation the impression that he is really taking part in an actual mission. The closer to the actual situation he believes himself to be, the more effective will be both his responses and the actual training itself. One important aspect of a display is the depth impression created. To achieve an appearance of reality, objects close to the observer must appear to be close, and objects distant must appear to be distant. When celestial objects are portrayed, their distance from an observer must appear to be infinite, particularly with respect to other space vehicles, and the like. One manner in which this particular aspect of a display may be created is to provide the appearance of objects which are supposed to be at differing distances from the observer with differing relative movements with time. Thus, as a mission progresses, the appearance of a fixed star background will change; different constellations will be presented for example; but the changes of the star background will be at a much slower rate than the changes in the appearance of closer objects. Thus, an approaching object will appear to approach against an apparently unchanging background while, actually, the background is also changing, but at a slower rate.

Distortion in the presentation of a display probably does more to destroy the appearance of reality than anything else. In fact, the elimination of distortion in images is the subject of much research. There are two general types of distortion which are of primary importance in imagery. They are color aberration and spherical aberration. Chromatic aberration is the focusing of the various colors at different points, producing a spectrum spread; spherical aberration is the deviation of light rays from an expected path with respect to adjacent light rays. A display in a simulated training device must be corrected for optical aberrations. Unfortunately, in the past optical correction systems have been complex and expensive and have usually resulted in dim imagery due to the absorption of much of the light being transmitted.

Parallax is present in virtually all objects which are viewed. Parallax is the apparent displacement of an object being viewed as the viewer changes his position with respect to that object. This is particularly true with close objects viewed against a distant background. Thus, if a display is to depict a close object against a fixed star background, the close object must appear to move more than the stars as the viewer moves his head. This is one aspect of simulated displays which has been the most overlooked, and yet, it is one of the most important when plausibility is to be achieved. Obviously, if an observer moves his head to the right, and the moon in a display appears to rapidly move to the left, the impression of reality is destroyed.

It is an object of this invention to provide a new and improved display system.

It is another object of this invention to provide a new and improved lens system for creating credible composite displays of the images of several objects.

It is a further object of this invention to provide a new and improved display system in which at least a portion of the optical system removes spherical aberrations of the lens.

It is still another object of this invention to provide an optical system which presents to viewers realistic images which are projected onto flat surfaces.

It is still a further object of this invention to provide a virtual image window display in which spherical aberration, curvature of the field, and distortion due to viewer displacement from the optical axis are eliminated.

Figure 2:
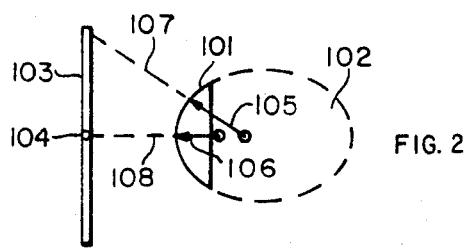
Figure 3:
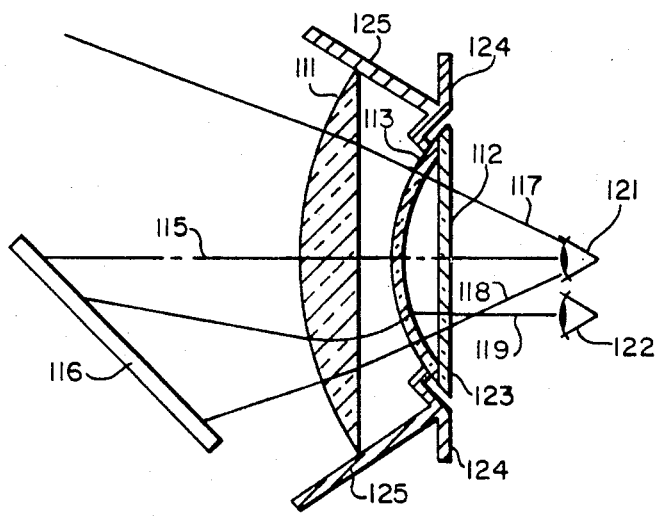

Other objects and advantages of this invention will become more apparent as the description proceeds, which description should be considered together with the accompanying drawings in which:

FIG. 1 is a schematic diagram of a system for creating a composite display according to this invention; and FIGS. 2 and 3 are schematic views of lenses which may be used in the system of this invention.

The principles of the display system of this invention can be explained with reference to FIG. 1 in which two separate optical systems 30 and 50 are illustrated. Consider first the system 30 in which an image generator 31 in the form of a housing containing a light source (not shown) and a lens system 29 having an optical axis 10 transmits an image to the positive lens 13. The lens 13 lies on the optical axis 10. Facing the lens 13 on the axis 10 is a duplicate lens 17. Midway between the lenses 13 and 17 and at the focal point 15 is a semitransparent screen 23 upon which the image transmitted through the lens 13 is projected. A transparency is mounted in the housing 31, and the light passes from the source through the transparency and the lens system 29 to provide a field having an angular width $A$. The second lens system 50 comprises an image generator 46 which is similar to the generator 31 and includes a lens system 44. A positive lens 47 similar to the lenses 13 and 17 is positioned before the generator 46. A semitransparent screen 49 is located on the optical axis 45 of the lens 48 at about the focal point of that lens. A light splitter, or semitransparent mirror 37, is centered about the intersection of the optical axis 10 of the lens 13 and the optical axis 45 of the lens 48 and forms an angle of 45° with both of these axes. The mirror 37 is so located with respect to the lenses 13, 17 and 48 that the distance between the lenses 17 and 48 along the optical axis 45 bent by the mirror 37 may be equal to the distance along the optical axis 10 between lenses 13 and 17. Screen 23 is stationary; screen 49 is movable.

The light from the source in the housing 31 passes through the transparency in the housing and through the lens system 29 to the lens 13. The image field through the transparency and through the lens 29 has an angular width $A$ and is limited by the dimensioning of the parts. The lens 29 serves as an image stop. The light coming from the generator 31 defining the desired image is designated by light rays 34 and 36 and forms, on the screen 23, the desired image. Screen 23 is a rear projection, or semitransparent screen, and the image formed thereon is also picked up by the lens 17. Both lenses 13 and 17 are located a focal length away from the screen 23. A viewer peering through lens 17 looks through an object stop 55 and sees the desired image with the distortions introduced by the lens 13 corrected. The field of view passing through the stop 55 covers an angle $A$, which is equal to the width of the field of view from the generator 31.

In the meantime, the generator 46 is operating in a manner similar to that of the generator 31. Light from a source (not shown) passes through a transparency (also not shown), both of which are contained in the housing 46, and through the lens system 44 to project through the lens 48 the desired image from the transparency. Since the generator 46 is similar to the generator 31, the angular width of the field therefrom is the same as that from generator 31. The image passes through the lens 48 with the opening in the generator 46 serving as a stop, and the image is formed on the screen 49. The screen 49 is movable as contrasted with the screen 23 which is fixed in position. The light which defines the image on the screen 49 passes to the semitransparent mirror 37 and is reflected through the lens 17 toward the observer. The image from the screen 23 also passes through the mirror 37, and the two images are superimposed there. It has been found that lenses 13 and 48 may be similar to, but not necessarily identical to, the lens 17 and still provide correction of the distortion to produce a believable image. In addition, the lenses 13 and 48 may be smaller than the lens 17, resulting in a material saving in initial cost. Further, the lens 48 may be adjusted to cooperate with the lens system 44 of the generator 46 so that the distance from lens 48 to the screen 49 is different from the focal distance of the lens 17. The projector lens system 44 is arranged so that its distance from the transparency is less than that lens system's infinity focal length. Then the distance between lens 48 and screen 49 may be increased. In this manner, the overall system may be adjusted to accommodate different housing requirements.

One of the important features of a display system of this type is the ability of the system to form a plausible composite image of two or more separate images of objects which are at different distances from the observer. The image produced by the generator 31 is at the greatest distance from the observer. In fact, for this discussion, consider the image produced by the generator 31 to be a fixed star background which is essentially at infinity. The image produced by the generator 46 is one of an object much closer to the observer. To approach reality, the two images must be combined to form a single image in which the far and the near objects appear to act differently. This is the purpose for fixedly supporting screen 23 and having screen 49 movable. In systems of this nature, the following equation holds true:

$$\frac{1}{F} = \frac{1}{D_0} - \frac{1}{D_i}$$

Where $F$ is the focal length of the lens
$D_0$ is the distance from the lens to the object, and
$D_i$ is the distance from the lens to the image.
In the case of the screen 23, the image formed on that screen by the lens 13 forms the object of the lens 17. Since the screen 23 is located at the focal distance from the lens 17, $1/F = 1/D_0$, and $1/D_i = 0$. Then, $D_i$ is infinite. Thus, the image which is passed through the lens 17 from the screen 23 appears to the observer to be an infinite distance away. In the system 50, the screen 49 is movable from the focal point of the lens 17 in the direction toward the lens 17. Moving screen 49 away from lens 17 throws the image out of focus. This means that in the system 50, the image the observer views appears to be at a finite distance from the lens 17. The relative distance can be adjusted over a range by the positioning of the screen 49. In addition, the screen 49 can be automatically movable in response to a prescribed condition so that the apparent distance of the image, produced by the generator 46, from the observer varies with the condition. When the screen 23 is at the focal point of the lens 17, light which is passed from the screen 23 to the lens 17 is divergent, but the light which emerges from the lens 17 is collimated. Should the screen be less than the focal distance from the lens, the light emerging from the lens is divergent. In either case, the image seen by the viewer is a virtual image.

The lenses 13, 17, and 48, are used to project an image produced by an image generator onto a flat screen or to view that image. To reduce the effects of spherical aberration as much as possible, an elliptical window lens has been developed to flatten the image. One form of such a lens is shown in FIG. 2 in which an ellipse 102 is shown in dashed lines with one end of the ellipse 102 formed with solid lines to define a planoconvex lens 101. A screen 103 is shown approximately at the focal point 104 of the lens 101. The radius of curvature of the lens 101 is continuously changing along its curved surface. Thus, the radius of curvature shown by line 105 at the outer edge of the lens 101 is longer than the radius of curvature 106 at the center of the lens. By the same token, the distances from the convex side of the lens 101 to the surface of the screen 103 are not the same from all points, and, for example, the line 107 is longer than the line 108. The relationship between the length of the line 108 with respect to the length of the line 106 is the same as the relationship of the length of the line 107 with respect to the line 105. In this manner, the elliptical lens 101 tends to flatten an image transmitted through it.

Another way in which distortion can be introduced into the system to reduce the reality of the final results is by the swimming effect which is often produced when the observer moves his eyes from the optical axis of the window lens 17. To reduce this swimming effect, a spherical corrector may be used as shown in FIG. 3. A window lens 111, of the elliptical type shown in FIG. 2, projects an image which passes through a semitransparent mirror 116 through a window 112 where it is viewed by an observer whose eye 121 is on the optical axis 115 of the lens 111. The window 112 is mounted in a bulkhead 123. Between the window 112 and the lens 111 is a spherical corrector 113 held in place by a bezel 124 or another suitable device. The diameter or diagonal of the window 112 is about the same size as the diameter of the spherical lens 113. Light, as shown by lines 117 and 118, which passes through the lens 111 and the corrector 113 to an observer on the optical axis 115 is not affected by the corrector 113. However, that light, as shown by the line 119, which passes through the lens 111 and the corrector 113 toward an observer 122 at a point off the optical axis 115, is refracted by the corrector 113 producing a negative aberration, tending to compensate for the apparent movement of the image as the eye moves from the position occupied at 121 to the position 122. The farther off the optical axis the observer is, the greater the correction. In addition, the system shown in FIG. 3 demonstrates how, with a lens 111 which is larger than the window 112, a wide field of view which is actually larger than that seen at any one time through the window 112 is achieved. As an observer moves his head to look through another portion of the window 112, he looks through the window at a different angle seeing more of the image than that available to him when his eye is on the optical axis 115. A shroud 125 surrounding the window 112 and the lens 111 prevents looking beyond the lens 111. In this manner, a 90° field of view is achieved, with the angle of view through the window 112 at any point being less than that.

In summary, the system of this invention provides a virtual image window display which approaches reality and which is relatively inexpensive in both its construction and its maintenance. The system of this invention utilizes image splitters or semitransparent mirrors for combining images onto a single optical axis. It utilizes simple positive lenses which are self-correcting. It utilizes two or more translucent screens upon which images may be projected and which are used to create the impression of differing distances from an observer of the several images generated by the system. Simple and inexpensive image generators of any suitable type may be used, and used interchangeably, to produce the images and the programmed changes of those images to meet the needs of any particular situation. The image transmission and projection systems used in the system of this invention are kept simple and direct to reduce as much as possible the absorption of light and the subsequent dimming of the images. In addition, the projection systems used are low in cost and inherently self-correcting to reduce the overall cost of the system and the cost of producing a realistic image. The final results are realistic in their appearance and in their actions. Distant objects appear to be at a distance; close objects appear to be close.

While it is realized that the above specification may indicate to others in the art additional ways in which the principles of this invention may be used, it is intended that this invention be limited only by the scope of the appended claims.

We claim:

1. A window lens system for presenting to an observer a realistic virtual image, said system comprising a flat surface upon which an image is focused, a planoconvex lens arranged with its convex surface facing said flat surface, said convex surface of said lens having a gradually increasing radius of curvature from the optical axis of said lens so that said lens presents to an observer looking at the plane surface of said lens a virtual image which is in focus throughout its extent of the image formed on said flat surface and a spherical connector for eliminating swimming effects of an image viewed through said window as the observer moves from the optical axis, said corrector comprising a portion of a hollow sphere having a substantially uniform wall thickness, said sphere being formed of an optically transparent material, and means for mounting said corrector in said window with its concave surface toward the observer.

2. The system defined in claim 1 wherein said flat surface is located approximately at the focus of said lens and wherein the light from said flat surface to said lens is divergent and from said lens to said observer is collimated.